(12) United States Patent
Chae

(10) Patent No.: US 11,705,105 B2
(45) Date of Patent: Jul. 18, 2023

(54) SPEECH SYNTHESIZER FOR EVALUATING QUALITY OF SYNTHESIZED SPEECH USING ARTIFICIAL INTELLIGENCE AND METHOD OF OPERATING THE SAME

(71) Applicant: LG ELECTRONICS INC., Seoul (KR)

(72) Inventor: Jonghoon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 741 days.

(21) Appl. No.: 16/500,021

(22) PCT Filed: May 15, 2019

(86) PCT No.: PCT/KR2019/005840
§ 371 (c)(1),
(2) Date: Oct. 1, 2019

(87) PCT Pub. No.: WO2020/203926
PCT Pub. Date: Nov. 19, 2020

(65) Prior Publication Data
US 2021/0217403 A1    Jul. 15, 2021

(51) Int. Cl.
*G10L 13/02* (2013.01)
*G10L 13/033* (2013.01)
(Continued)

(52) U.S. Cl.
CPC .......... *G10L 13/02* (2013.01); *G06N 3/08* (2013.01); *G10L 13/033* (2013.01); *G10L 13/08* (2013.01);
(Continued)

(58) Field of Classification Search
None
See application file for complete search history.

(56) References Cited

U.S. PATENT DOCUMENTS 10,643,600 B1 *   5/2020   Aryal .................... G10L 13/033
2003/0163316 A1   8/2003   Addison
(Continued)

FOREIGN PATENT DOCUMENTS

JP    2010-060846 A    3/2010
JP    6452591 B2 *    1/2019
(Continued)

OTHER PUBLICATIONS

Thomas Drugman, Goeric Huybrechts, Viacheslav Klimkov, Alexis Moinet; Traditional Machine Learning for Pitch Detection, Mar. 4, 2019; Pages: All (Year: 2019).*

*Primary Examiner* — Richa Mishra
(74) *Attorney, Agent, or Firm* — Birch, Stewart, Kolasch & Birch, LLP

(57) ABSTRACT

A speech synthesizer for evaluating quality of a synthesized speech using artificial intelligence includes a database configured to store a synthesized speech corresponding to text, a correct speech corresponding to the text and a speech quality evaluation model for evaluating the quality of the synthesized speech, and a processor configured to compare a first speech feature set indicating a feature of the synthesized speech and a second speech feature set indicating a feature of the correct speech, acquire a quality evaluation index set including indices used to evaluate the quality of the synthesized speech according to a result of comparison, and determine weights as model parameters of the speech quality evaluation model using the acquired quality evaluation index set and the speech quality evaluation model.

9 Claims, 8 Drawing Sheets

(51) Int. Cl.
  *G10L 13/08*   (2013.01)
  *G10L 25/60*   (2013.01)
  *G10L 25/30*   (2013.01)
  *G10L 25/51*   (2013.01)
  *G06N 3/08*    (2023.01)

(52) U.S. Cl.
  CPC .............. *G10L 25/30* (2013.01); *G10L 25/51* (2013.01); *G10L 25/60* (2013.01)

(56) References Cited

U.S. PATENT DOCUMENTS

2017/0076714 A1    3/2017  Mori et al.
2019/0318722 A1*  10/2019  Bromand ................ G10L 13/02
2020/0105244 A1*   4/2020  Kuramitsu ............ G10L 13/033

FOREIGN PATENT DOCUMENTS

KR   10-2010-0114737 A   10/2010
WO   WO 2018/159402 A1    9/2018

* cited by examiner

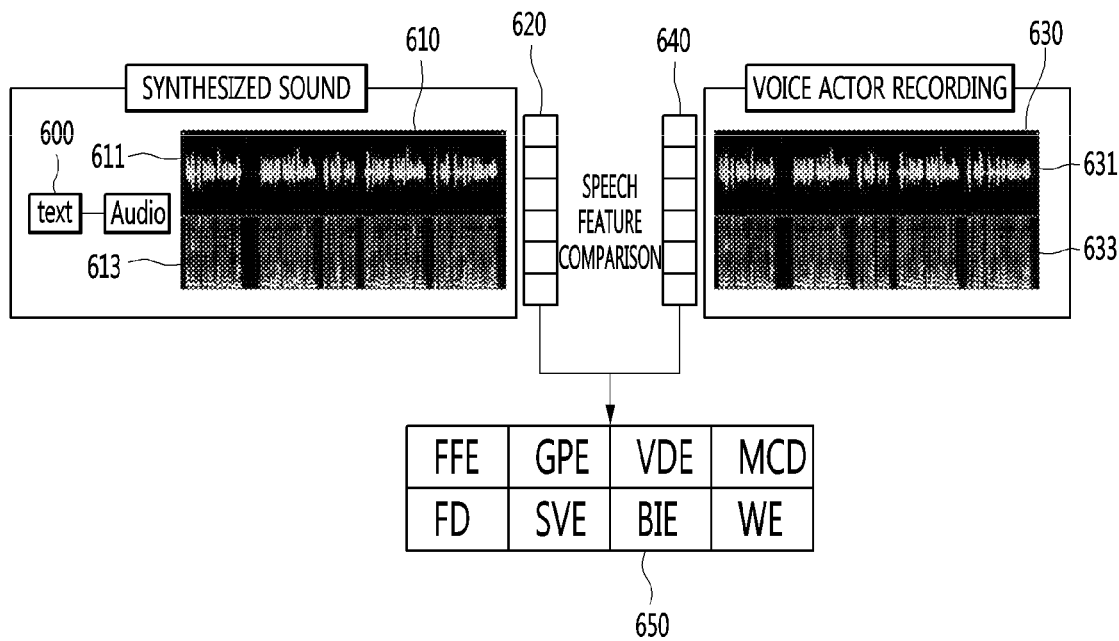

FIG. 8
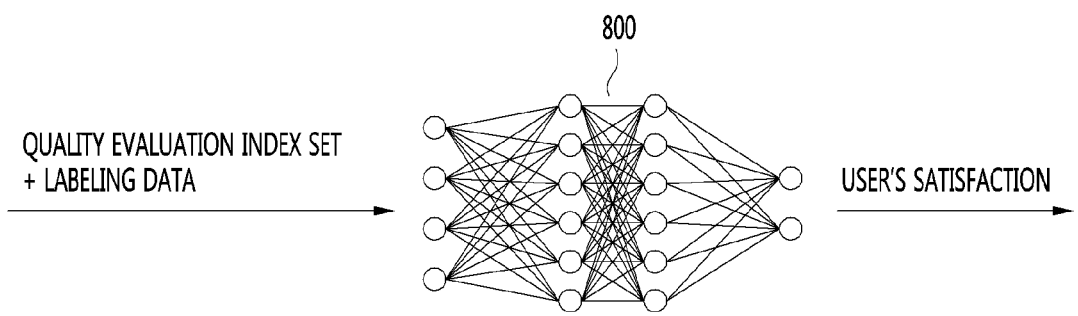
QUALITY EVALUATION INDEX SET + LABELING DATA → [800] → USER'S SATISFACTION
FIG. 9
| FFE | GPE | VDE | MCD | FD | SVE | BIE | WE | USER'S SATISFACTION |
|---|---|---|---|---|---|---|---|---|
| a1 | b1 | c1 | d1 | e1 | f1 | g1 | h1 | Good |
| a2 | b2 | c2 | d2 | e2 | f2 | g2 | h2 | Good |
| a3 | b3 | c3 | d3 | e3 | f3 | g3 | h3 | SoSo |
| a4 | b4 | c4 | d4 | e4 | f4 | g4 | h4 | SoSo |
| a5 | b5 | c5 | d5 | e5 | f5 | g5 | h5 | Bad |
| a6 | b6 | c6 | d6 | e6 | f6 | g6 | h6 | Bad |
FIG. 10
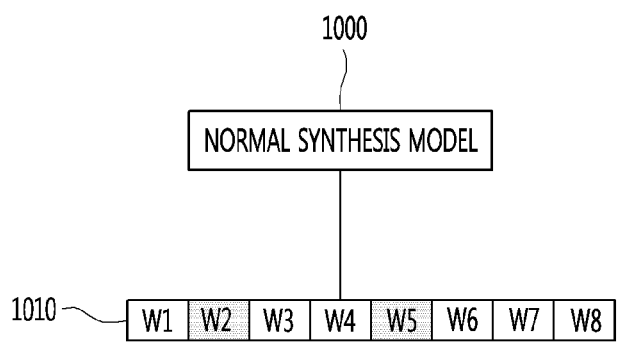

SPEECH SYNTHESIZER FOR EVALUATING QUALITY OF SYNTHESIZED SPEECH USING ARTIFICIAL INTELLIGENCE AND METHOD OF OPERATING THE SAME

CROSS REFERENCE TO RELATED APPLICATIONS

This application is the National Phase of PCT International Application No. PCT/KR2019/005840, filed on May 15, 2019, all of which is hereby expressly incorporated by reference into the present application.

TECHNICAL FIELD

The present invention relates to a speech synthesizer and, more particularly, to a speech quality evaluation device for evaluating a synthesized speech using artificial intelligence.

BACKGROUND ART

Competition for speech recognition technology which has started in smartphones is expected to become fiercer in the home with diffusion of the Internet of things (IoT).

In particular, an artificial intelligence (AI) device capable of issuing a command using speech and having a talk is noteworthy.

A speech recognition service has a structure for selecting an optimal answer to a user's question using a vast amount of database.

A speech search function refers to a method of converting input speech data into text in a cloud server, analyzing the text and retransmitting a real-time search result to a device.

The cloud server has a computing capability capable of dividing a large number of words into speech data according to gender, age and intonation and storing and processing the speech data in real time.

As more speech data is accumulated, speech recognition will be accurate, thereby achieving human parity.

A synthesized speech is an artificial speech generated by synthesizing a speech signal with respect to given text.

Conventionally, objective and quantitative indices for comprehensively evaluating the quality of the synthesized speech were insufficient.

Accordingly, even if the synthesized speech is generated, it is difficult to determine whether the speech is generated for a desired purpose.

DISCLOSURE

Technical Problem

An object of the present invention is to provide a speech synthesizer using artificial intelligence, which is capable of comprehensively evaluating the quality of a synthesized speech.

Another object of the present invention is to provide a speech synthesizer using artificial intelligence, which is capable of comprehensively evaluating the quality of a synthesized speech according to the synthesis purpose of the synthesized speech.

Technical Solution

A speech synthesizer for evaluating quality of a synthesized speech using artificial intelligence according to an embodiment of the present invention includes a database configured to store a synthesized speech corresponding to text, a correct speech corresponding to the text and a speech quality evaluation model for evaluating the quality of the synthesized speech, and a processor configured to compare a first speech feature set indicating a feature of the synthesized speech and a second speech feature set indicating a feature of the correct speech, acquire a quality evaluation index set including indices used to evaluate the quality of the synthesized speech according to a result of comparison, and determine weights as model parameters of the speech quality evaluation model using the acquired quality evaluation index set and the speech quality evaluation model.

A method of operating a speech synthesizer for evaluating quality of a synthesized speech using artificial intelligence according to another embodiment of the present invention includes comparing a first speech feature set indicating a feature of a synthesized speech stored in a database and a second speech feature set indicating a feature of a correct speech stored in the database, acquiring a quality evaluation index set including indices used to evaluate the quality of the synthesized speech according to a result of comparison, and determining weights as model parameters of the speech quality evaluation model using the acquired quality evaluation index set and the speech quality evaluation model.

Advantageous Effects

According to the embodiment of the present invention, it is possible to objectively and quantitatively determine the quality of a synthesized speech.

According to the embodiment of the present invention, it is possible to greatly improve quality accuracy of a synthesized speech according to a synthesis purpose of a user.

In addition, since user's satisfaction according to the synthesis purpose may be estimated through a speech quality evaluation model, it is possible to obtain a listening result without enabling a user to directly listen to a synthesized speech. Therefore, the quality of the synthesized speech may be objectively and quantitatively evaluated.

DESCRIPTION OF DRAWINGS

FIG. 2 is a view illustrating the concept of another example of a deformable mobile artificial intelligence device according to the present invention.

FIG. 6 is a diagram illustrating a process of comparing a first speech feature set of a synthesized speech with a second speech feature set of a correct speech and extracting a quality evaluation index set, and FIG. 7 is a diagram illustrating the quality evaluation index set in detail.

FIG. 8 is a diagram illustrating a process of learning a speech quality evaluation model based on an artificial neural network according to an embodiment of the present invention, and FIG. 9 is a view showing an example of learning data used to learn a speech quality evaluation model.

FIG. 9 is a view showing an example of learning data used to learn a speech quality evaluation model according to an embodiment of the present invention.

FIGS. 10 to 12 are views illustrating a weight set of the model parameters of a speech quality evaluation model varying according to the synthesis purpose of a synthesized speech according to an embodiment of the present invention.

BEST MODE

Figure 1:
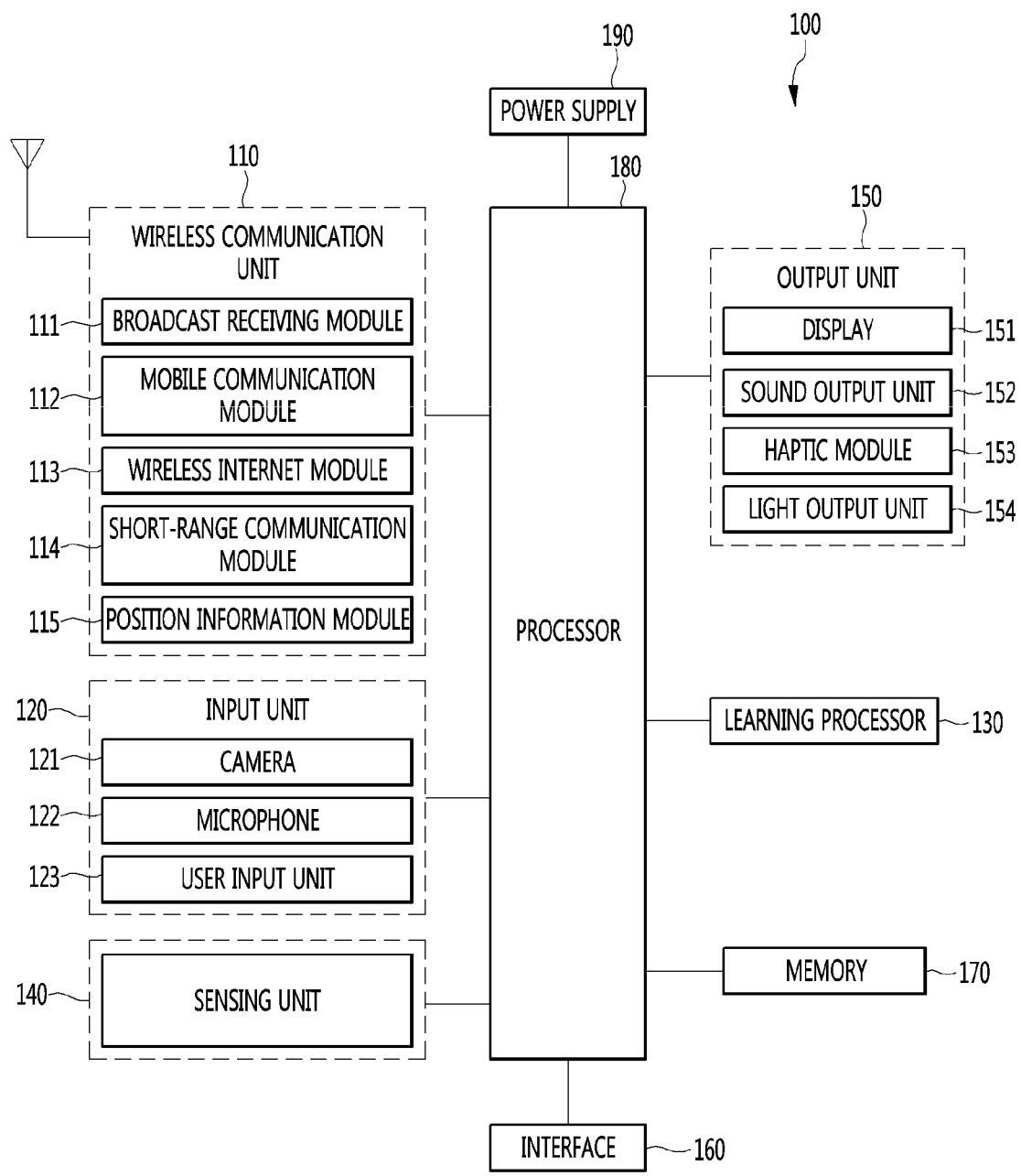
FIG. 1 is a block diagram illustrating an artificial intelligence device according to the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" or "unit" may be used to refer to elements or components. Use of such a suffix herein is merely intended to facilitate description of the specification, and the suffix itself is not intended to have any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

While ordinal numbers including 'first', 'second', etc. may be used to describe various components, they are not intended to limit the components. These expressions may be used to distinguish one component from another component.

When it is said that a component is 'coupled with/to' or 'connected to' another component, it should be understood that the one component is connected to the other component directly or through any other component in between. On the other hand, when it is said that a component is 'directly connected to' or 'directly coupled to' another component, it should be understood that there is no other component between the components.

The artificial intelligence device described in this specification may include cellular phones, smart phones, laptop computers, digital broadcast artificial intelligence devices, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

However, the artificial intelligence device 100 described in this specification is applicable to stationary artificial intelligence devices such as smart TVs, desktop computers or digital signages.

In addition, the artificial intelligence device 100 according to the embodiment of the present invention is applicable to stationary or mobile robots.

In addition, the artificial intelligence device 100 according to the embodiment of the present invention may perform the function of a speech agent. The speech agent may be a program for recognizing the speech of a user and audibly outputting a response suitable to the recognized speech of the user.

The artificial intelligence device 100 may include a wireless communication unit 110, an input unit 120, a learning processor 130, a sensing unit 140, an output unit 150, an interface 160, a memory 170, a processor 180 and a power supply 190.

The wireless communication unit 110 may include at least one of a broadcast reception module 111, a mobile communication module 112, a wireless Internet module 113, a short-range communication module 114 and a location information module 115.

The broadcast reception module 111 receives broadcast signals and/or broadcast associated information from an external broadcast management server through a broadcast channel.

The mobile communication module 112 may transmit and/or receive wireless signals to and from at least one of a base station, an external terminal, a server, and the like over a mobile communication network established according to technical standards or communication methods for mobile communication (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless Internet module 113 is configured to facilitate wireless Internet access. This module may be installed inside or outside the artificial intelligence device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like.

The short-range communication module 114 is configured to facilitate short-range communication and to support short-range communication using at least one of Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The location information module 115 is generally configured to acquire the position (or the current position) of the mobile artificial intelligence device. Representative examples thereof include a Global Position System (GPS) module or a Wi-Fi module. As one example, when the artificial intelligence device uses a GPS module, the position of the mobile artificial intelligence device may be acquired using a signal sent from a GPS satellite.

The input unit 120 may include a camera 121 for receiving a video signal, a microphone 122 for receiving an audio signal, and a user input unit 123 for receiving information from a user.

Voice data or image data collected by the input unit 120 may be analyzed and processed as a control command of the user.

The input unit 120 may receive video information (or signal), audio information (or signal), data or user input information. For reception of video information, the artificial intelligence device 100 may include one or a plurality of cameras 121.

The camera 121 may process image frames of still images or moving images obtained by image sensors in a video call more or an image capture mode. The processed image frames can be displayed on the display 151 or stored in memory 170.

The microphone 122 processes an external acoustic signal into electrical audio data. The processed audio data may be variously used according to function (application program) executed in the artificial intelligence device 100. Meanwhile, the microphone 122 may include various noise removal algorithms to remove noise generated in the process of receiving the external acoustic signal.

The user input unit 123 receives information from a user. When information is received through the user input unit 123, The processor 180 may control operation of the artificial intelligence device 100 in correspondence with the input information.

The user input unit 123 may include one or more of a mechanical input element (for example, a mechanical key, a button located on a front and/or rear surface or a side surface of the artificial intelligence device 100, a dome switch, a jog wheel, a jog switch, and the like) or a touch input element. As one example, the touch input element may be a virtual key, a soft key or a visual key, which is displayed on a touchscreen through software processing, or a touch key located at a location other than the touchscreen.

The learning processor 130 may be configured to receive, classify, store and output information to be used for data mining, data analysis, intelligent decision, mechanical learning algorithms and techniques.

The learning processor 130 may include one or more memory units configured to store data received, detected, sensed, generated or output in a predetermined manner or another manner by the artificial intelligence device or received, detected, sensed, generated or output in a predetermined manner or another manner by another component, device, artificial intelligence device or device for communicating with the artificial intelligence device.

The learning processor 130 may include a memory integrated with or implemented in the artificial intelligence device. In some embodiment, the learning processor 130 may be implemented using the memory 170.

Selectively or additionally, the learning processor 130 may be implemented using a memory related to the artificial intelligence device, such as an external memory directly coupled to the artificial intelligence device or a memory maintained in a server communicating with the artificial intelligence device.

In another embodiment, the learning processor 130 may be implemented using a memory maintained in a cloud computing environment or another remote memory accessible by the artificial intelligence device through the same communication scheme as a network.

The learning processor 130 may be configured to store data in one or more databases in order to identify, index, categorize, manipulate, store, retrieve and output data to be used for supervised or unsupervised learning, data mining, predictive analysis or other machines.

Information stored in the learning processor 130 may be used by one or more other controllers of the artificial intelligence device or the processor 180 using any one of different types of data analysis algorithms and machine learning algorithms.

Examples of such algorithms include k-nearest neighbor systems, fuzzy logic (e.g., possibility theory), neural networks, Boltzmann machines, vector quantization, pulse neural networks, support vector machines, maximum margin classifiers, hill climbing, inductive logic system Bayesian networks, Petri Nets (e.g., finite state machines, Mealy machines or Moore finite state machines), classifier trees (e.g., perceptron trees, support vector trees, Marcov trees, decision tree forests, random forests), betting models and systems, artificial fusion, sensor fusion, image fusion, reinforcement learning, augmented reality, pattern recognition, and automated planning.

The processor 180 may make a decision using data analysis and machine learning algorithms and determine or predict at least one executable operation of the artificial intelligence device based on the generated information. To this end, the processor 180 may request, retrieve, receive or use the data of the processor 130 and control the artificial intelligence device to execute preferable operation or predicted operation of at least one executable operation.

The processor 180 may perform various functions for implementing intelligent emulation (that is, a knowledge based system, an inference system and a knowledge acquisition system). This is applicable to various types of systems (e.g., a fussy logic system) including an adaptive system, a machine learning system, an artificial neural system, etc.

The processor 180 may include a sub module for enabling operation involving speech and natural language speech processing, such as an I/O processing module, an environmental condition module, speech-to-text (STT) processing module, a natural language processing module, a workflow processing module and a service processing module.

Each of such sub modules may have an access to one or more systems or data and models at the artificial intelligence device or a subset or superset thereof. In addition, each of the sub modules may provide various functions including vocabulary index, user data, a workflow model, a service model and an automatic speech recognition (ASR) system.

In another embodiment, the other aspects of the processor 180 or the artificial intelligence device may be implemented through the above-described sub modules, systems or data and models.

In some embodiments, based on the data of the learning processor 130, the processor 180 may be configured to detect and sense requirements based on the context condition or user's intention expressed in user input or natural language input.

The processor 180 may actively derive and acquire information necessary to fully determine the requirements based on the context condition or user's intention. For example, the processor 180 may actively derive information necessary to determine the requirements, by analyzing historical data including historical input and output, pattern matching, unambiguous words, and input intention, etc.

The processor 180 may determine a task flow for executing a function for responding to the requirements based on the context condition or the user's intention.

The processor 180 may be configured to collect, sense, extract, detect and/or receive signals or data used for data analysis and machine learning operations through one or more sensing components at the artificial intelligence device, in order to collect information for processing and storage from the learning processor 130.

Information collection may include sensing information through a sensor, extracting information stored in the memory 170, or receiving information from another artificial intelligence device, an entity or an external storage device through a communication unit.

The processor 180 may collect and store usage history information from the artificial intelligence device.

The processor 180 may determine the best match for executing a specific function using the stored usage history information and predictive modeling.

The processor 180 may receive or sense surrounding environment information or other information through the sensing unit 140.

The processor 180 may receive broadcast signals and/or broadcast related information, wireless signals or wireless data through the wireless communication unit 110.

The processor 180 may receive image information (or signals corresponding thereto), audio signal (or signals corresponding thereto), data or user input information from the input unit 120.

The processor 180 may collect information in real time, process or classify the information (e.g., a knowledge graph, a command policy, a personalization database, a dialog engine, etc.), and store the processed information in the memory 170 or the learning processor 130.

When the operation of the artificial intelligence device is determined based on data analysis and machine learning algorithms and techniques, the processor 180 may control the components of the artificial intelligence device in order to execute the determined operation. The processor 180 may control the terminal according to a control command and perform the determined operation.

When the specific operation is performed, the processor 180 may analyze historical information indicating execution of the specific operation through data analysis and machine learning algorithms and techniques and update previously learned information based on the analyzed information.

Accordingly, the processor 180 may improve accuracy of future performance of data analysis and machine learning algorithms and techniques based on the updated information, along with the learning processor 130.

The sensing unit 140 may include one or more sensors configured to sense internal information of the mobile artificial intelligence device, the surrounding environment of the mobile artificial intelligence device, user information, and the like.

For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121), a microphone 122, a battery gauge, an environment sensor (for example, a barometer, a hygrometer, a thermometer, a radiation detection sensor, a thermal sensor, and a gas sensor), and a chemical sensor (for example, an electronic nose, a health care sensor, a biometric sensor, and the like). The mobile artificial intelligence device disclosed in this specification may be configured to combine and utilize information obtained from at least two sensors of such sensors.

The output unit 150 is typically configured to output various types of information, such as audio, video, tactile output, and the like. The output unit 150 may include a display 151, an audio output module 152, a haptic module 153, and a light output unit 154.

The display 151 is generally configured to display (output) information processed in the artificial intelligence device 100. For example, the display 151 may display execution screen information of an application program executed by the artificial intelligence device 100 or user interface (UI) and graphical user interface (GUI) information according to the executed screen information.

The display 151 may have an inter-layered structure or an integrated structure with a touch sensor in order to realize a touchscreen. The touchscreen may provide an output interface between the artificial intelligence device 100 and a user, as well as function as the user input unit 123 which provides an input interface between the artificial intelligence device 100 and the user.

The audio output module 152 is generally configured to output audio data received from the wireless communication unit 110 or stored in the memory 170 in a call signal reception mode, a call mode, a record mode, a speech recognition mode, a broadcast reception mode, and the like.

The audio output module 152 may also include a receiver, a speaker, a buzzer, or the like.

A haptic module 153 can be configured to generate various tactile effects that a user feels. A typical example of a tactile effect generated by the haptic module 153 is vibration.

A light output unit 154 may output a signal for indicating event generation using light of a light source of the artificial intelligence device 100. Examples of events generated in the artificial intelligence device 100 may include message reception, call signal reception, a missed call, an alarm, a schedule notice, email reception, information reception through an application, and the like.

The interface 160 serves as an interface with external devices to be connected with the artificial intelligence device 100. The interface 160 may include wired or wireless headset ports, external power supply ports, wired or wireless data ports, memory card ports, ports for connecting a device having an identification module, audio input/output (I/O) ports, video I/O ports, earphone ports, or the like. The artificial intelligence device 100 may perform appropriate control related to the connected external device in correspondence with connection of the external device to the interface 160.

The identification module may be a chip that stores a variety of information for granting use authority of the artificial intelligence device 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the artificial intelligence device 100 via the interface 160.

The memory 170 stores data supporting various functions of the artificial intelligence device 100.

The memory 170 may store a plurality of application programs or applications executed in the artificial intelligence device 100, data and commands for operation of the artificial intelligence device 100, and data for operation of the learning processor 130 (e.g., at least one piece of algorithm information for machine learning).

The processor 180 generally controls overall operation of the artificial intelligence device 100, in addition to operation related to the application program. The processor 180 may process signals, data, information, etc. input or output through the above-described components or execute the application program stored in the memory 170, thereby processing or providing appropriate information or functions to the user.

In addition, the processor 180 may control at least some of the components described with reference to FIG. 1 in order to execute the application program stored in the memory 170. Further, the processor 180 may operate a combination of at least two of the components included in the artificial intelligence device 100, in order to execute the application program.

The power supply 190 receives external power or internal power and supplies the appropriate power required to operate respective components included in the artificial intelligence device 100, under control of the controller 180. The power supply 190 may include a battery, and the battery may be a built-in or rechargeable battery.

Meanwhile, as described above, the processor 180 controls operation related to the application program and overall operation of the artificial intelligence device 100. For example, the processor 180 may execute or release a lock function for limiting input of a control command of the user to applications when the state of the mobile artificial intelligence device satisfies a set condition.

Figure 2:
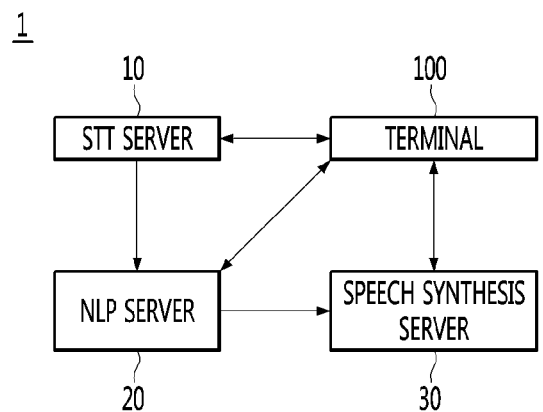
FIG. 2 is a diagram illustrating a speech system according to an embodiment of the present invention.

FIG. 2 is a diagram illustrating a speech system according to an embodiment of the present invention.

Referring to FIG. 2, the speech system 1 includes an artificial intelligence device 100, a speech-to-text (STT) server 10, a natural language processing (NLP) server 20 and a speech synthesis server 30.

The artificial intelligence device 100 may transmit speech data to the STT server 10.

The STT server 10 may convert the speech data received from the artificial intelligence device 100 into text data.

The STT server 10 may increase accuracy of speech-text conversion using a language model.

The language model may mean a model capable of calculating a probability of a sentence or a probability of outputting a next word is output when previous words are given.

For example, the language model may include probabilistic language models such as a unigram model, a bigram model, an N-gram model, etc.

The unigram model refers to a model that assumes that use of all words is completely independent of each other and calculates the probability of a word string by a product of the probabilities of words.

The bigram model refers to a model that assumes that use of words depends on only one previous word.

The N-gram model refers to a model that assumes that use of words depends on (n−1) previous words.

That is, the STT server 10 may determine when the speech data is appropriately converted into the text data using the language model, thereby increasing accuracy of conversion into the text data.

The NLP server 20 may receive the text data from the STT server 10. The NLP server 20 may analyze the intention of the text data based on the received text data.

The NLP server 20 may transmit intention analysis information indicating the result of performing intention analysis to the artificial intelligence device 100.

The NLP server 20 may sequentially perform a morpheme analysis step, a syntax analysis step, a speech-act analysis step, a dialog processing step with respect to text data, thereby generating intention analysis information.

The morpheme analysis step refers to a step of classifying the text data corresponding to the speech uttered by the user into morphemes as a smallest unit having a meaning and determining the part of speech of each of the classified morphemes.

The syntax analysis step refers to a step of classifying the text data into a noun phrase, a verb phrase, an adjective phrase, etc. using the result of the morpheme analysis step and determines a relation between the classified phrases.

Through the syntax analysis step, the subject, object and modifier of the speech uttered by the user may be determined.

The speech-act analysis step refers to a step of analyzing the intention of the speech uttered by the user using the result of the syntax analysis step. Specifically, the speech-act step refers to a step of determining the intention of a sentence such as whether the user asks a question, makes a request, or expresses simple emotion.

The dialog processing step refers to a step of determining whether to answer the user's utterance, respond to the user's utterance or question about more information.

The NLP server 20 may generate intention analysis information including at least one of the answer to, a response to, or a question about more information on the intention of the user's utterance, after the dialog processing step.

Meanwhile, the NLP server 20 may receive the text data from the artificial intelligence device 100. For example, when the artificial intelligence device 100 supports the speech-to-text conversion function, the artificial intelligence device 100 may convert the speech data into the text data and transmit the converted text data to the NLP server 20.

The speech synthesis server 30 may synthesize prestored speech data to generate a synthesized speech.

The speech synthesis server 30 may record the speech of the user selected as a model and divide the recorded speech into syllables or words. The speech synthesis server 30 may store the divided speech in an internal or external database in syllable or word units.

The speech synthesis server 30 may retrieve syllables or words corresponding to the given text data from the database and synthesize the retrieved syllables or words, thereby generating the synthesized speech.

The speech synthesis server 30 may store a plurality of speech language groups respectively corresponding to a plurality of languages.

For example, the speech synthesis server 30 may include a first speech language group recorded in Korean and a second speech language group recorded in English.

The speech synthesis server 30 may translate text data of a first language into text of a second language and generate a synthesized speech corresponding to the translated text of the second language using the second speech language group.

The speech synthesis server 30 may transmit the synthesized speech to the artificial intelligence device 100.

The speech synthesis server 30 may receive the intention analysis information from the NLP server 20.

The speech synthesis server 30 may generate the synthesized speech including the intention of the user based on the intention analysis information.

In one embodiment, the STT server 10, the NLP server 20 and the speech synthesis server 30 may be implemented as one server.

The respective functions of the STT server 10, the NLP server 20 and the speech synthesis server 30 may also be performed in the artificial intelligence device 100. To this end, the artificial intelligence device 100 may include a plurality of processors.

Figure 3:
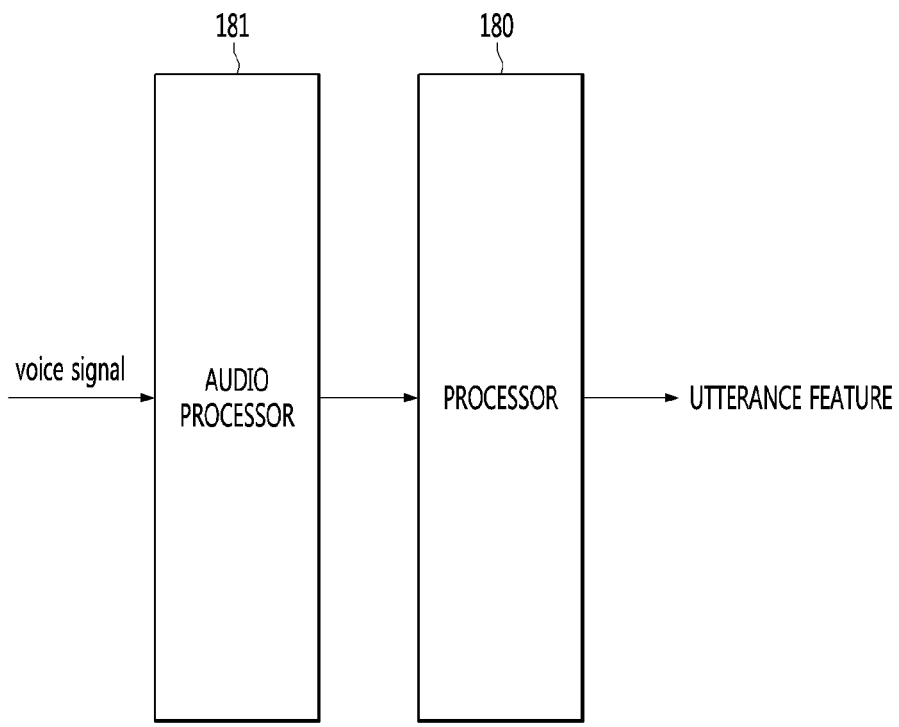
FIG. 3 is a diagram illustrating a process of extracting utterance features of a user from a speech signal according to an embodiment of the present invention.

FIG. 3 is a diagram illustrating a process of extracting utterance features of a user from a speech signal according to an embodiment of the present invention.

The artificial intelligence device 100 shown in FIG. 1 may further include an audio processor 181.

The audio processor 181 may be implemented as a chip separated from the processor 180 or a chip included in the processor 180.

The audio processor 181 may remove noise from the speech signal.

The audio processor 181 may convert the speech signal into text data. To this end, the audio processor 181 may include an STT engine.

The audio processor 181 may recognize a wake-up word for activating speech recognition of the artificial intelligence device 100. The audio processor 181 may convert the wake-up word received through the microphone 122 into text data and determine that the wake-up word is recognized when the converted text data corresponds to the prestored wake-up word.

The audio processor 181 may convert the speech signal, from which noise is removed, into a power spectrum.

The power spectrum may be a parameter indicating a frequency component included in the waveform of the speech signal varying with time, and a magnitude thereof.

The power spectrum shows a distribution of an amplitude squared value according to the frequency of the waveform of the speech signal.

This will be described with reference to FIG. 4.

Figure 4:
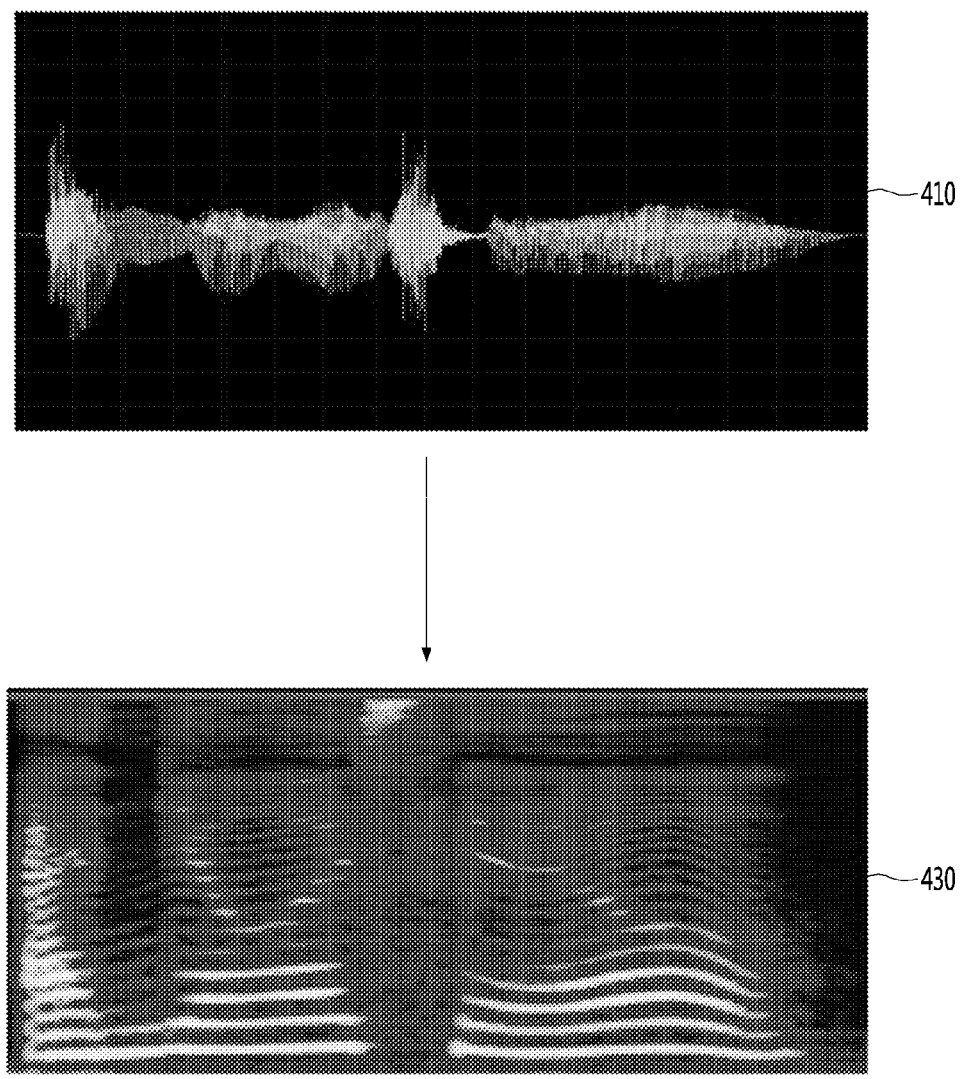
FIG. 4 is a diagram illustrating an example of converting a speech signal into a power spectrum according to an embodiment of the present invention.

FIG. 4 is a diagram illustrating an example of converting a speech signal into a power spectrum according to an embodiment of the present invention.

Referring to FIG. 4, the speech signal 410 is shown. The speech signal 410 may be received through the microphone 121 or prestored in the memory 170.

The x-axis of the speech signal 410 denotes a time and the y-axis denotes an amplitude.

The audio processor 181 may convert the speech signal 410, the x-axis of which is a time axis, into a power spectrum 430, the x-axis of which is a frequency axis.

The audio processor 181 may convert the speech signal 410 into the power spectrum 430 using Fast Fourier transform (FFT).

The x-axis of the power spectrum 430 denotes a frequency and the y-axis of the power spectrum 430 denotes a squared value of an amplitude.

FIG. 3 will be described again.

The processor 180 may determine utterance features of a user using at least one of the power spectrum 430 or the text data received from the audio processor 181.

The utterance features of the user may include the gender of the user, the pitch of the user, the tone of the user, the topic uttered by the user, the utterance speed of the user, the volume of the user's voice, etc.

The processor 180 may acquire the frequency of the speech signal 410 and the amplitude corresponding to the frequency using the power spectrum 430.

The processor 180 may determine the gender of the user who utters a speech, using the frequency band of the power spectrum 430.

For example, the processor 180 may determine the gender of the user as a male when the frequency band of the power spectrum 430 is within a predetermined first frequency band range.

The processor 180 may determine the gender of the user as a female when the frequency band of the power spectrum 430 is within a predetermined second frequency band range.

Here, the second frequency band range may be larger than the first frequency band range.

The processor 180 may determine the pitch of the speech using the frequency band of the power spectrum 430.

For example, the processor 180 may determine the pitch of the speech according to the amplitude within a specific frequency band range.

The processor 180 may determine the tone of the user using the frequency band of the power spectrum 430. For example, the processor 180 may determine a frequency band having a certain amplitude or more among the frequency bands of the power spectrum 430 as a main register of the user and determines the determined main register as the tone of the user.

The processor 180 may determine the utterance speed of the user through the number of syllables uttered per unit time from the converted text data.

The processor 180 may determine the topic uttered by the user using a Bag-Of-Word Model scheme with respect to the converted text data.

The Bag-Of-Word Model scheme refers to a scheme for extracting mainly used words based on the frequency of words in a sentence. Specifically, the Bag-Of-Word Model scheme refers to a scheme for extracting unique words from a sentence, expressing the frequency of the extracted words by a vector and determining the uttered topic as a feature.

For example, when words <running>, <physical strength>, etc. frequently appears in the text data, the processor 180 may classify the topic uttered by the user into an exercise.

The processor 180 may determine the topic uttered by the user from the text data using a known text categorization scheme. The processor 180 may extract keywords from the text data and determine the topic uttered by the user.

The processor 180 may determine the volume of user's voice in consideration of the amplitude information in an entire frequency band.

For example, the processor 180 may determine the volume of user's voice based on an average or weighted average of amplitudes in each frequency band of the power spectrum.

The functions of the audio processor 181 and the processor 180 described with reference to FIGS. 3 and 4 may be performed in any one of the NLP server 20 or the speech synthesis server 30.

For example, the NLP server 20 may extract the power spectrum using the speech signal and determine the utterance features of the user using the extracted power spectrum.

Figure 5A:
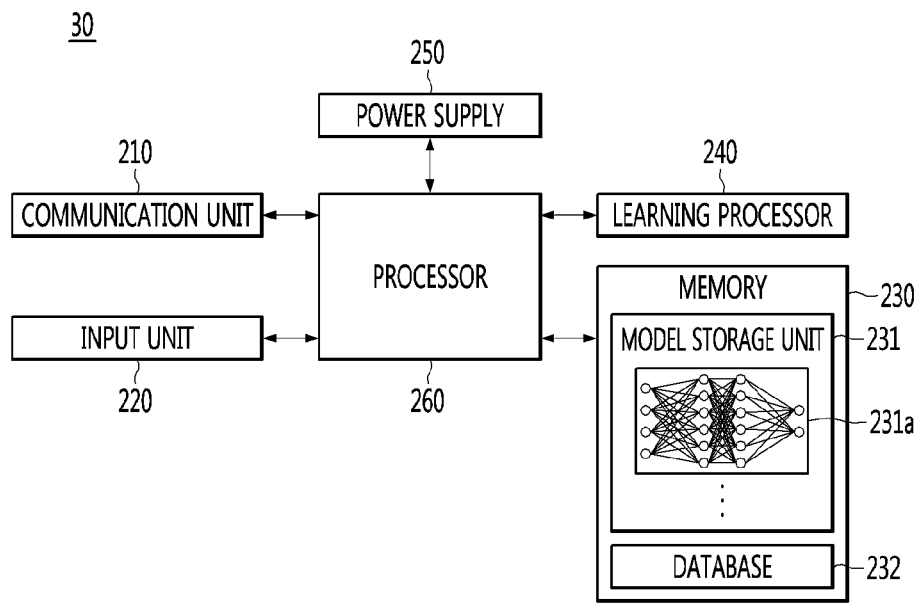
FIG. 5a is a block diagram illustrating the configuration of a speech synthesis server according to an embodiment of the present invention.

FIG. 5a is a block diagram illustrating the configuration of a speech synthesis server according to an embodiment of the present invention.

The speech synthesis server 30 is a device or server disposed outside the terminal 100 and may perform the same function as the learning processor 130 of the terminal 100.

That is, the speech synthesis server 30 may be configured to receive, classify, store and output information to be used for data mining, data analysis, intelligent decision, mechanical learning algorithms. Here, the machine learning algorithms may include a deep learning algorithm.

The speech synthesis server 30 may communicate with at least one terminal 100 and derive a result by analyzing or learning data instead of or in aid of the terminal 100. Aiding another device may mean distribution of computing power through distribution processing.

The speech synthesis server 30 is a variety of devices for learning an artificial neural network, may generally mean a server, and may be referred to as a learning device or a learning server.

In particular, the speech synthesis server 30 may be implemented not only as a single server but also as a plurality of server sets, a cloud server or a combination thereof.

That is, a plurality of speech synthesis servers 30 may configure a learning device set (or a cloud server) and at least one speech synthesis server 30 included in the learning device set may derive a result by analyzing or learning data through distribution processing.

The speech synthesis server 30 may transmit a model learned by machine learning or deep learning to the terminal 100 periodically or according to a request.

Referring to FIG. 5a, the speech synthesis server 30 may include a communication unit 210, an input unit 220, a memory 230, a learning processor 240, a power supply 250 and a processor 260.

The communication unit 210 may correspond to a component including the wireless communication unit 110 and the interface 160 of FIG. 1. That is, data may be transmitted to and received from another device through wired/wireless communication or an interface.

The input unit 220 may correspond to the input unit 120 of FIG. 1 and acquire data by receiving data through the communication unit 210.

The input unit 220 may acquire input data for acquiring output using training data for model learning or a trained model.

The input unit 220 may acquire raw input data. In this case, the processor 260 may preprocess the acquired data to generate training data or preprocessed input data capable of being input to model learning.

At this time, preprocessing of the input data performed by the input unit 220 may mean extraction of input features from the input data.

The memory 230 may correspond to the memory 170 of FIG. 1.

The memory 230 may include a model storage unit 231 and a database 232.

The model storage unit 231 stores a model (or an artificial neural network 231a) which is learned or being learned through the learning processor 240 and stores an updated model when the model is updated through learning.

At this time, the model storage unit 231 may classify and store the trained model into a plurality of versions according to a learning time point or learning progress, as necessary.

The artificial neural network 231a shown in FIG. 2 is merely an example of the artificial neural network including a plurality of hidden layers and the artificial neural network of the present invention is not limited thereto.

The artificial neural network 231a may be implemented in hardware, software or a combination of hardware and software. When some or the whole of the artificial neural network 231a is implemented in software, one or more commands configuring the artificial neural network 231a may be stored in the memory 230.

The database 232 stores the input data acquired by the input unit 220, learning data (or training data) used for model learning, or a learning history of a model.

The input data stored in the database 232 may be not only data processed to suit model learning but also raw input data.

The learning processor 240 corresponds to the learning processor 130 of FIG. 1.

The learning processor 240 may train or learn the artificial neural network 231a using training data or a training set.

The learning processor 240 may immediately acquire data obtained by preprocessing the input data acquired by the processor 260 through the input unit 220 to learn the artificial neural network 231a or acquire the preprocessed input data stored in the database 232 to learn the artificial neural network 231a.

Specifically, the learning processor 240 may determine the optimized model parameters of the artificial neural network 231a, by repeatedly learning the artificial neural network 231a using the above-described various learning schemes.

In this specification, the artificial neural network having parameters determined through learning using training data may be referred to as a training model or a trained model.

At this time, the training model may infer a result value in a state of being installed in the speech synthesis server 30 of the artificial neural network and may be transmitted to and installed in another device such as the terminal 100 through the communication unit 210.

In addition, when the training model is updated, the updated training model may be transmitted to and installed in another device such as the terminal 100 through the communication unit 210.

The power supply 250 corresponds to the power supply 190 of FIG. 1.

A repeated description of components corresponding to each other will be omitted.

Figure 5B:
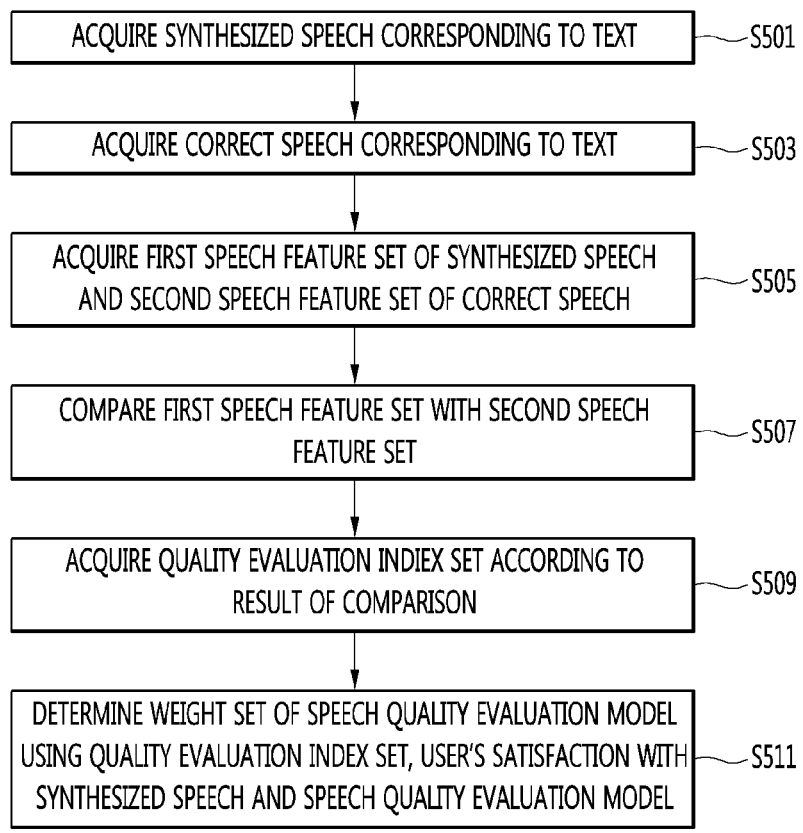
FIG. 5b is a flowchart illustrating a method of operating a speech synthesis server using artificial intelligence according to an embodiment of the present invention.

FIG. 5b is a flowchart illustrating a method of operating a speech synthesis server using artificial intelligence according to an embodiment of the present invention.

The processor 260 of the speech synthesis server 30 acquires a synthesized speech corresponding to text (S501).

The processor 260 may convert text into a speech using a text-to-speech (TTS) engine.

The processor 260 may acquire a speech signal and a power spectrum corresponding to the synthesized speech. Each of the speech signal and the power spectrum may have the form shown in FIG. 4.

The processor 260 may extract the synthesized speech corresponding to text from the database 232.

The processor 260 of the speech synthesis server 30 acquires a correct speech corresponding to text (S503).

The processor 260 may extract the correct speech corresponding to text from the database 232. The text is equal to the text of step S501.

The correct speech may be a speech uttered and recorded by a voice actor.

The processor 260 may acquire the speech signal and the power spectrum corresponding to the correct speech. Each of the speech signal and the power spectrum may have the form shown in FIG. 4.

The processor 260 acquires a first speech features set indicating the feature of the synthesized speech from the synthesized speech and a second speech feature set indicating the feature of the correct speech from the correct speech (S505).

The speech feature set may be a combination of the features of the speech.

The features of the speech may include the pitch of voiceless sound and the pitch of voiced sound configuring a speech, the formant (or the frequency band) of the speech, a break index of each word configuring the speech, the pitch of the speech, the utterance speed of the speech, the pitch contour of the voice, etc.

The processor 260 may acquire the first speech feature set from the speech signal and power spectrum of the synthesized speech.

The processor 260 may acquire the second speech feature set from the speech signal and power spectrum of the correct speech.

The processor 260 compares the first speech feature set with the second speech feature set (S507).

The processor 260 may compare the first speech feature set with the second speech feature set, in order to evaluate the quality of the synthesized speech.

The processor 260 acquires a quality evaluation index set according to the result of comparing the first speech feature set with the second speech feature set (S509).

The quality evaluation index set may include indices used to evaluate the quality of the synthesized speech.

The quality of the synthesized speech may be determined based on similarity between the synthesized speech and the correct speech.

As similarity between the synthesized speech and the correct speech increases, the quality of the synthesized speech may increase, and, as similarity between the synthesized speech and the correct speech decreases, the quality of the synthesized speech may decrease.

The quality evaluation index set may include F0 Frame Error (FFE), Gross Pitch Error (GPE), Voicing Decision Error (VDE), Mel Cepstral Distortion (MCD), Formant Distance (FD), Speaker Verification Error (SVE), Break Index Error (BIE), and Word Error (WE).

The quality evaluation index set will be described with reference to the following drawings.

FIG. 6 is a diagram illustrating a process of comparing a first speech feature set of a synthesized speech with a second speech feature set of a correct speech and extracting a quality evaluation index set, and FIG. 7 is a diagram illustrating the quality evaluation index set in detail.

First, FIG. 6 will be described.

The processor 260 may convert text 600 into a synthesized speech 610 using a TTS engine.

The synthesized speech 610 may include a speech signal 611 indicating the waveform of the synthesized speech 610 and a power spectrum 613 corresponding to the speech signal 611.

The processor 260 may extract the first speech feature set 620 from the speech signal 611 and the power spectrum 613.

The correct speech 630 may be a speech uttered and recorded by a specific voice actor.

The correct speech 630 may include a speech signal 631 and a power spectrum 633 corresponding to text 600.

The processor 260 may extract a second speech feature set 640 from the speech signal 631 and the power spectrum 633.

The processor 260 may compare the extracted first speech feature set 620 with the second speech feature set 640 and calculate a quality evaluation index set 650 according to the result of comparison.

Referring to FIG. 7, the quality evaluation index set 650 is shown.

The quality evaluation index set 650 may include F0 frame error, gross pitch error 653, voicing decision error 653, Mel Cepstral distortion 654, formant distance 655, speaker verification error 656, break index error 657 and word error 658.

F0 frame error 651 may be an index indicating the number of frames in which error occurs among the frames of the correct speech and the frames of the synthesized speech. Here, the frame may correspond to the speech signal or power spectrum corresponding to a phoneme unit.

F0 frame error 651 may be expressed by a sum of gross pitch error 652 and voicing decision error 653.

Gross pitch error 652 may be an index indicating a difference between the pitch of the voiced sound of the correct speech and the pitch of the voiced sound of the synthesized speech.

Voicing decision error 653 may be an index indicating the number of times of synthesizing the voiced sound as voiceless sound and synthesizing voiceless sound as voiced sound.

Mel Cepstral distortion 654 may be an index indicating a total of differences between the correct speech and the synthesized speech per MFCC (Mel Frequency Cepstral Coefficient) dimension.

Formant distance 655 may be an index indicating a total of differences between the correct speech and the synthesized speech per formant.

Speaker verification error 656 may be an index indicating a speaker recognition success rate of a speech recognizer. Speaker verification error 656 may indicate a rate at which the synthesized speech is recognized as a speech indicating a specific speaker when the synthesized speech is recognized through the speech recognizer.

Break error 657 may be an index indicating a difference between a break degree (or position) of each word of the correct speech and a break degree (or position) of each word of the synthesized speech.

Word error 658 may be an index indicating a word pronunciation error rate of the synthesized speech.

Word error 658 may be an index indicating the number of words which are incorrectly pronounced to the total number of words in a plurality of words configuring the correct speech and a plurality of words configuring the synthesized speech.

The quality evaluation index set 650 may be used as an index for determining how similarly the synthesized speech is synthesized with the correct speech.

FIG. 5b will be described again.

The processor 260 determines a weight set of a speech quality evaluation model using the acquired quality evaluation index set, user's satisfaction with the synthesized speech and the speech quality evaluation model (S511).

The user's satisfaction may be feedback from a user indicating how much the user naturally listens to the synthesized speech when the synthesized speech is output.

The speech quality evaluation model is a model for evaluating the quality of the synthesized speech and may be an artificial neural network based model learned by any one of a machine learning algorithm or a deep learning algorithm.

The speech quality evaluation model may be stored in the database 232 of the speech synthesis server 30.

The speech quality evaluation model may be a model learned by and stored in the learning processor 240 of the speech synthesis server 30.

The speech quality evaluation model may be a model learned to infer the user's satisfaction indicating a feature point using the quality evaluation index set which is learning data and labeling data as one training set.

The speech quality evaluation model may be learned through supervised learning. Specifically, learning data used to learn the speech quality evaluation model may be labeled with the user's satisfaction, and the speech quality evaluation model may be learned using the labeled learning data.

A process of learning the speech quality evaluation model will be described with reference to the following drawings.

FIG. 8 is a diagram illustrating a process of learning a speech quality evaluation model based on an artificial neural network according to an embodiment of the present invention, and FIG. 9 is a view showing an example of learning data used to learn a speech quality evaluation model.

First FIG. 8 will be described.

Referring to FIG. 8, the quality evaluation index set which is learning data may be labeled with labeling data and input to the artificial neural network based speech quality evaluation model 800.

The labeling data may be user's satisfaction indicating a correct answer. The user's satisfaction may be expressed by three state values (Good, SoSo, Bad), but this is merely an example. That is, the user's satisfaction may be expressed by a numerical value of 0 to 10.

The speech quality evaluation model 800 may be learned with the goal of accurately inferring the labeled user's satisfaction from the quality evaluation index set.

The cost function of the speech quality evaluation model 800 may be expressed by a squared mean of a difference between the label of the user's satisfaction corresponding to each learning data and the user's satisfaction inferred from each learning data.

The processor 260 may determine the model parameters of the speech quality evaluation model 800 through learning to minimize the cost function. Each of the model parameters may indicate the weight corresponding to each index included in the quality evaluation index set.

When an input feature vector is extracted from the quality evaluation index set and input to the speech quality evaluation model 800, a result of determining the user's satisfaction may be output as a target feature vector. The speech quality evaluation model 800 may be learned to minimize the value of the cost function corresponding to the difference between the output target feature vector and the labeled user's satisfaction.

For example, the target feature point of the speech quality evaluation model 800 may be composed of an output layer of a plurality of nodes indicating the user's satisfaction, may have a value of <2> when the satisfaction is high, have a value of <1> when the satisfaction is middle, and have a value of <0> when the satisfaction is low.

FIG. 9 is a diagram showing an example of learning data used to learn the speech quality evaluation model according to an embodiment of the present invention.

Referring to FIG. 9, a training table 900 used to learn the speech quality evaluation model 800 is shown.

The training table 900 may include a plurality of training sets.

Each training set may include the quality evaluation index set and the user's satisfaction labeled with the quality evaluation index set.

The processor 260 may receive the quality evaluation index set as input data, acquire the target feature point corresponding to the user's satisfaction using the speech quality evaluation model 800, and determine the user's satisfaction according to the acquired target feature point.

For example, the processor 260 may acquire a scalar two-dimensional vector between 0 and 1 of the user's satisfaction as the output result of the speech quality evaluation model 800.

The processor 260 may determine the user's satisfaction using the two-dimensional vector.

The processor 260 may determine the weights of the speech quality evaluation model 800 to minimize the value of the cost function corresponding to the determined user's satisfaction and the labeled satisfaction.

Each weight may correspond to each index included in the quality evaluation index set.

The processor 260 may store the determined weights in the database 232.

The determined weights may be used as the model parameters of the speech quality evaluation model 800 to maximize the user's satisfaction with the quality of the synthesized speech.

Meanwhile, according to another embodiment of the present invention, the weight set which is the model parameters of the speech quality evaluation model may vary according to the synthesis purpose of the synthesized speech.

This will be described with reference to FIGS. 10 to 12.

Figure 11:
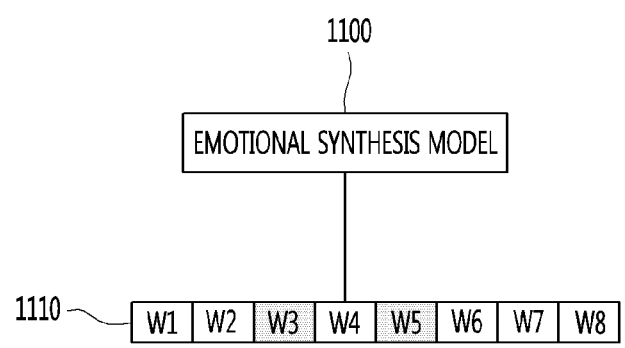
Figure 12:
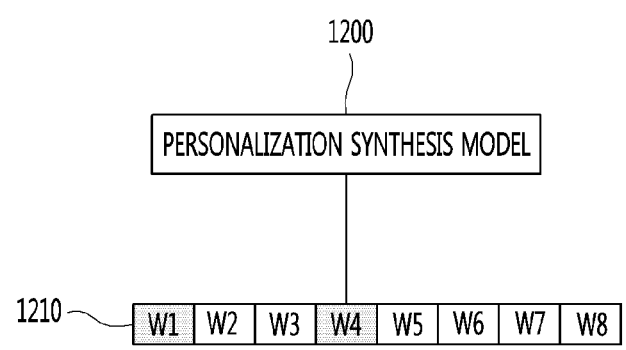

FIGS. 10 to 12 are views illustrating the weight set of the model parameters of a speech quality evaluation model varying according to the synthesis purpose of a synthesized speech according to an embodiment of the present invention.

In FIGS. 10 to 12, assume that the weight of F0 frame error 651 is W1, the weight of gross pitch error 652 is W2, the weight of voicing decision error 653 is W3, the weight of Mel Cepstral distortion 654 is W4, the weight of formant distance 655 is W5, the weight of speaker verification error 656 is W6, the weight of break index error 657 is W7 and the weight of word error 658 is W8.

First, FIG. 10 is a view illustrating a weight set for normal synthesis focused on maintaining of a normal tone.

A normal synthesis model 1000 may be used as a speech quality evaluation model for normal synthesis. The normal synthesis model 1000 may be an artificial neutral network based model, as shown in FIG. 8.

In the case of the normal synthesis model 1000, the weight W2 of gross pitch error 652 and the weight W5 of formant distance 655 included in the weight set 1010 which is the model parameter set may be learned to have greater values than the other weights, according to learning.

FIG. 11 is a view illustrating a weight set for an emotional synthesized speech focused on change in pitch, contour and utterance speed of the synthesized speech.

As the speech quality evaluation model for the emotional synthesized speech, an emotional synthesis model 1100 may be used.

The emotional synthesis model 1100 may be an artificial neural network based model shown in FIG. 8.

The emotional synthesis model 1100 may be learned such that the weight W3 of voicing decision error 653 and the weight W5 of formant distance 655 included in the weight set 1110 have greater values than the other weights.

FIG. 12 is a view illustrating a weight set for personalization synthesis focused on the tone of a specific speaker.

As the speech quality evaluation model for personalization synthesis, a personalization synthesis model 1200 may be used.

The personalization synthesis model 1200 may be an artificial neural network based model, as shown in FIG. 8.

Learning may be performed such that the weight W1 of F0 frame error 651 and the weight W4 of Mel Cepstral distortion 654 included in the weight set 1210 indicating the model parameters of the personalization synthesis model 1200 have greater values than the other weights.

The weight set which is the model parameters of the speech quality evaluation model may vary according to the synthesis purpose of the synthesized speech.

Therefore, it is possible to greatly improve quality accuracy of the synthesized speech.

In addition, since user's satisfaction according to the synthesis purpose may be estimated through a speech quality evaluation model, it is possible to obtain a listening result without enabling a user to directly listen to a synthesized speech. Therefore, the quality of the synthesized speech may be objectively and quantitatively evaluated.

Figure 13:
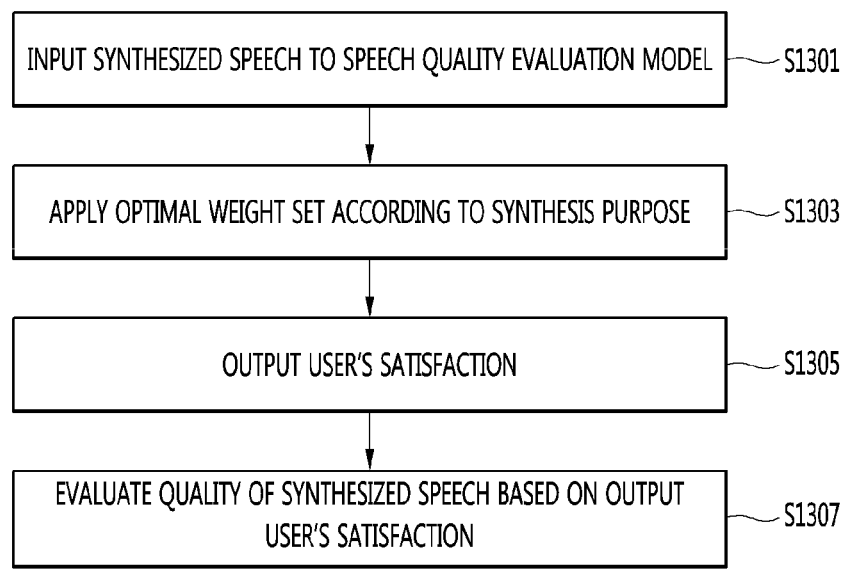
FIG. 13 is a flowchart illustrating a method of evaluating the quality of a synthesized speech of a speech synthesis server according to an embodiment of the present invention.

FIG. 13 is a flowchart illustrating a method of evaluating the quality of a synthesized speech of a speech synthesis server according to an embodiment of the present invention.

FIG. 13 may be performed after step S511 of FIG. 5b. That is, after an optimal weight set is determined, a new synthesized speech may be input to a speech evaluation quality model.

Referring to FIG. 13, the processor 260 of the speech synthesis server 30 inputs the synthesized speech to the speech quality evaluation model (S1301).

The processor 260 applies the weight set suiting the synthesis purpose of the synthesized speech to the speech quality evaluation model (S1303).

The processor 260 outputs user's satisfaction as the result output by applying the weight set suiting the synthesis purpose (S1305).

The processor 260 evaluates the quality of the synthesized speech based on the output user's satisfaction (S1307).

In one embodiment, the processor 260 may determine that the quality of the synthesized speech is a highest level, when the user's satisfaction is <Good>.

The processor 260 may determine that the quality of the synthesized speech is a middle level, when the user's satisfaction is <SoSo>.

The processor 260 may determine that the quality of the synthesized speech is a lowest level, when the user's satisfaction is <Bad>.

In addition, since user's satisfaction according to the synthesis purpose may be estimated through a speech quality evaluation model, it is possible to obtain a listening result without enabling a user to directly listen to a synthesized speech. Therefore, the quality of the synthesized speech may be objectively and quantitatively evaluated.

The present invention mentioned in the foregoing description can also be embodied as computer readable codes on a computer-readable recording medium. Examples of possible computer-readable mediums include HDD (Hard Disk Drive), SSD (Solid State Disk), SDD (Silicon Disk Drive), ROM, RAM, CD-ROM, a magnetic tape, a floppy disk, an optical data storage device, etc. The computer may include the processor 180 of the artificial intelligence device.

The invention claimed is:

1. A speech synthesizer for evaluating quality of a synthesized speech using artificial intelligence, the speech synthesizer comprising: a data base configured to store a synthesized speech corresponding to text, a correct speech corresponding to the text and a speech quality evaluation model for evaluating the quality of the synthesized speech; and a processor configured to:
compare a first speech feature set indicating a feature of the synthesized speech and a second speech feature set indicating a feature of the correct speech, wherein each of the first speech feature set and the second speech feature set includes a pitch of voiceless sound of a speech, a pitch of voiced sound of the speech, a frequency band of the speech, a break index of a word configuring the speech, a pitch of the speech, an utterance speed of the speech, or a pitch contour of the speech, acquire a quality evaluation index set including indices used to evaluate the quality of the synthesized speech according to a result of the comparing, wherein the quality evaluation index set includes an F0 Frame Error (FFE), a Gross Pitch Error (GPE), a Voicing Decision Error (VDE), a Mel Cepstral Distortion (MCD), a Formant Distance (FD), a Speaker Verification Error (SVE), a Break Index Error (BIE) and a Word Error (WE), and determine weights as model parameters of the speech quality evaluation model using the acquired quality evaluation index set and the speech quality evaluation model, wherein the processor differently determines the weights according to a synthesis purpose of the synthesized speech and updates the speech quality evaluation model based on the weights to generate an updated speech quality evaluation model, wherein a weight of the GPE and a weight of the FD are set to be learned to have greater values than weights of other quality evaluation indexes when the synthesis purpose is a normal synthesis for maintaining a tone,
wherein a weight of the VDE and a weight of the FD are set to be learned to have greater values than weights of other quality evaluation indexes when the synthesis purpose is an emotional synthesis for outputting an emotional synthesis speech,
wherein a weight of the FFE and a weight of the MCD are set to be learned to have greater values than weights of other quality evaluation indexes when the synthesis purpose is a personalization synthesis for outputting the synthesized speech suiting a tone of a specific speaker, and
wherein the updated speech quality evaluation model is applied to recognize a wake-up word for activating speech recognition or to generate the synthesized speech from the text.

2. The speech synthesizer according to claim 1, wherein the speech quality evaluation model is an artificial neural network based model learned using a machine learning algorithm or a deep learning algorithm.

3. The speech synthesizer according to claim 2, wherein the speech quality evaluation model is a model supervised-learned using the quality evaluation index set and user's satisfaction labeled with the quality evaluation index set.

4. The speech synthesizer according to claim 3, wherein the processor extracts an input feature vector from the quality evaluation index set, inputs the extracted input feature vector to the speech quality evaluation model, and learns the speech quality evaluation model to minimize a cost function corresponding to a difference between output user's satisfaction and the labeled user's satisfaction when a result of inferring the labeled user's satisfaction is output as a target feature vector.

5. The speech synthesizer according to claim 1, wherein, when a new synthesized speech is input to the speech quality evaluation model, the processor outputs user's satisfaction using a determined weight set and evaluates a quality level of the synthesized speech based on the output user's satisfaction.

6. A method of operating a speech synthesizer for evaluating quality of a synthesized speech using artificial intelligence, the method comprising: comparing, by a processor in the speech synthesizer, a first speech feature set indicating a feature of a synthesized speech stored in a database and a second speech feature set indicating a feature of a correct speech stored in the database, wherein each of the first speech feature set and the second speech feature set includes a pitch of voiceless sound of a speech, a pitch of voiced sound of the speech, a frequency band of the speech, a break index of a word configuring the speech, a pitch of the speech, an utterance speed of the speech or a pitch contour of the speech; acquiring, by the processor, a quality evaluation index set including indices used to evaluate the quality of the synthesized speech according to a result of the comparing, wherein the quality evaluation index set includes an F0 Frame Error (FFE), a Gross Pitch Error (GPE), a Voicing Decision Error (VDE), a Mel Cepstral Distortion (MCD), a Formant Distance (FD), a Speaker Verification Error (SVE), a Break Index Error (BIE) and a Word Error (WE); and determining, by the processor, weights as model parameters of a speech quality evaluation model using the acquired quality evaluation index set and the speech quality evaluation model, wherein the weights are differently determined, by the processor, according to a synthesis purpose of the synthesized speech and the processor updates the speech quality evaluation model based on the weights to generate an updated speech quality evaluation model, wherein a weight of the GPE and a weight of the FD are set to be learned to have greater values than weights of other quality evaluation indexes when the synthesis purpose is a normal synthesis for maintaining a tone, wherein a weight of the VDE and a weight of the FD are set to be learned to have greater values than weights of other quality evaluation indexes when the synthesis purpose is an emotional synthesis for outputting an emotional synthesis speech, wherein a weight of the FFE and a weight of the MCD are set to be learned to have greater values than weights of other quality evaluation indexes when the synthesis purpose is a personalization synthesis for outputting the synthesized speech suiting a tone of a specific speaker, and wherein the updated speech quality evaluation model is applied to recognize a wake-up word for activating speech recognition or to generate the synthesized speech from text.

7. The method according to claim 6, wherein the speech quality evaluation model is an artificial neural network based model learned using a machine learning algorithm or a deep learning algorithm, and wherein the speech quality evaluation model is a model supervised-learned using the quality evaluation index set and user's satisfaction labeled with the quality evaluation index set.

8. The method according to claim 7, further comprising:

extracting an input feature vector from the quality evaluation index set;

inputting the extracted input feature vector to the speech quality evaluation model;

outputting a result of inferring the labeled user's satisfaction as a target feature vector; and learning the speech quality evaluation model to minimize a cost function corresponding to a difference between output user's satisfaction and the labeled user's satisfaction.

9. The method according to claim 6, further comprising, when a new synthesized speech is input to the speech quality evaluation model, outputting user's satisfaction using a determined weight set and evaluating a quality level of the synthesized speech based on the output user's satisfaction.

* * * * *